March 17, 1959  G. G. BESNARD ET AL  2,877,568
SUBJECT-MATTER TRAINER
Filed March 28, 1956  3 Sheets-Sheet 1
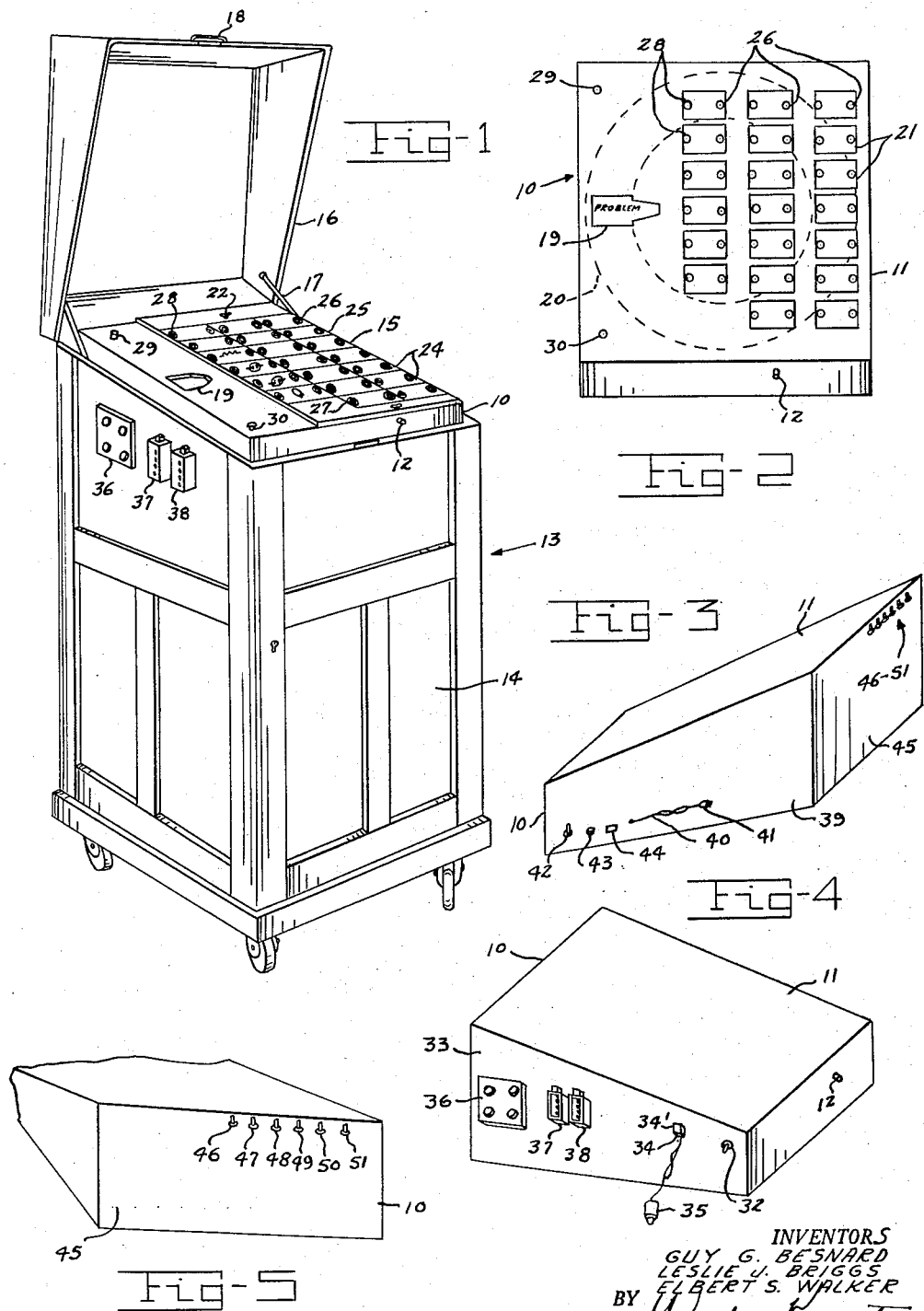
INVENTORS
GUY G. BESNARD
LESLIE J. BRIGGS
ELBERT S. WALKER
BY
ATTORNEYS

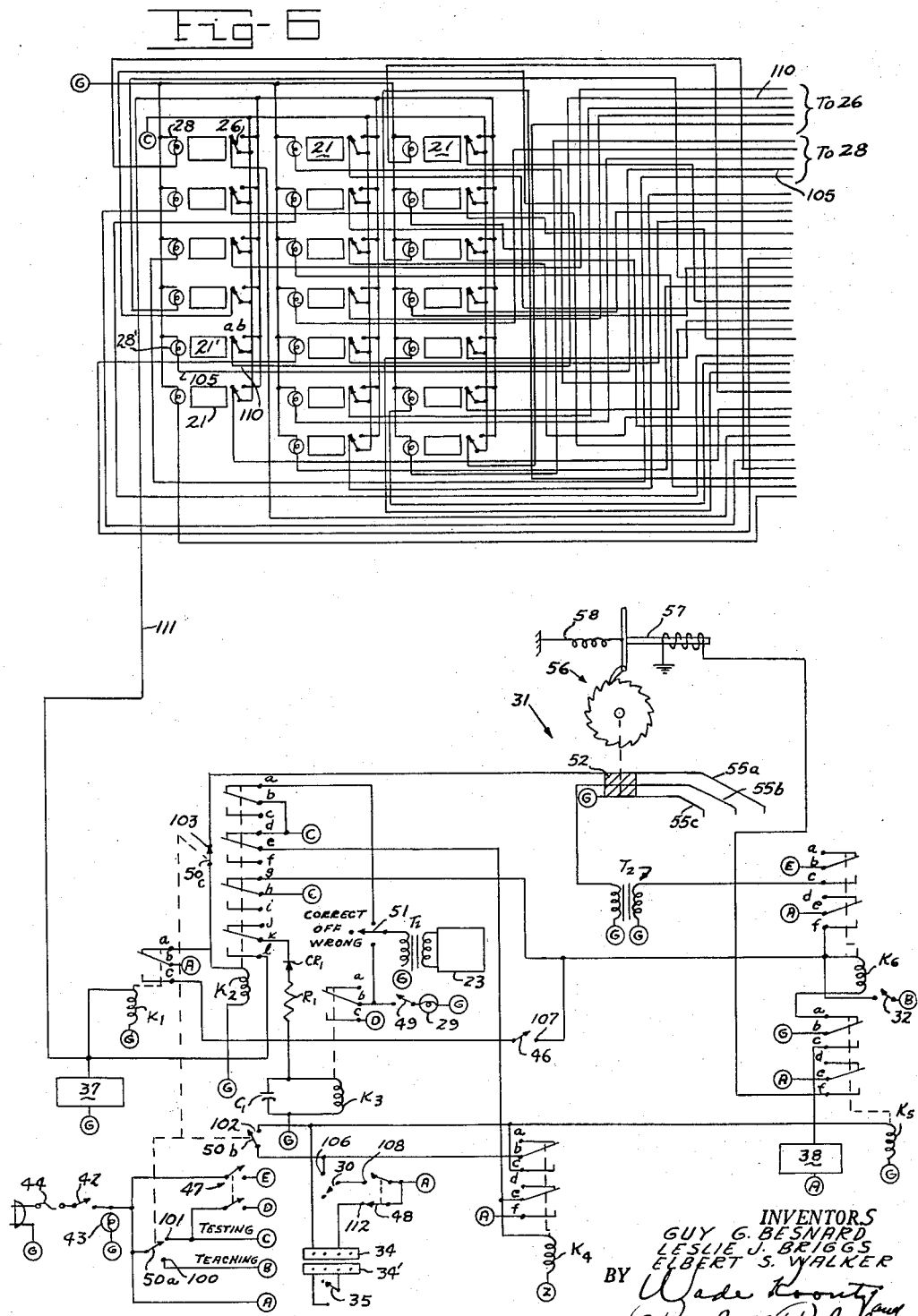

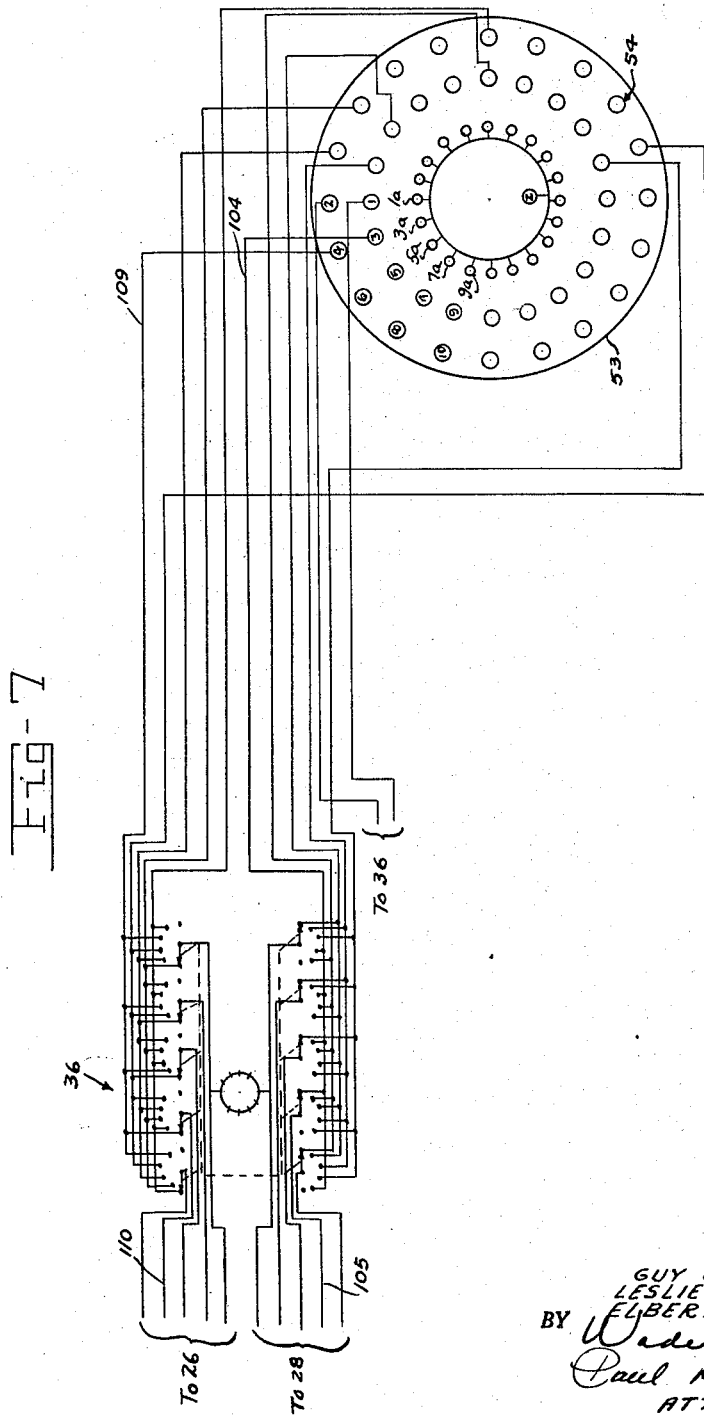

United States Patent Office 2,877,568
Patented Mar. 17, 1959

2,877,568

SUBJECT-MATTER TRAINER

Guy G. Besnard, Novato, Calif., Leslie J. Briggs, Denver, Colo., and Elbert S. Walker, Camp Borden, Ontario, Canada, assignors to the United States of America as represented by the Secretary of the Air Force Application March 28, 1956, Serial No. 574,568

6 Claims. (Cl. 35—9)

The invention described herein may be manufactured and used by or for the United States Government for governmental purposes without payment to us of any royalty thereon.

This invention relates to a subject-matter trainer, and more particularly, to an automatic, self-operated educational device of the type adapted for conducting self-studying of subject matter to be mastered in various courses by providing automatic, guided practice of such subject matter under a variety of modes of operation.

The purpose of the present invention is to provide an educational device for classroom practices so as to enable students to practice and learn certain information and skills required in their courses without the continuous aid of their instructors.

In classrooms, particularly of technical schools, it is typical for one instructor to be instructing a number of students in maintenance knowledges and skills by various methods. Usually each classroom is equipped with one or two training mock-ups composed of actual components of a system for permitting students to practice maintenance procedures upon them from time to time, but the task of arranging instruction so that all students are kept profitably busy at all times is a difficult one.

Normally, while one or two students practice maintenance procedures on the equipment, an effort is made to keep the rest of the class busy reading, taking notes, and reviewing the notes. However the amount of learning accomplished by these latter activities is dubious and the noise of the operating equipment makes discussions difficult.

The training device constructed according to present invention affords more active rehearsal, with continuous reinforcement, of appropriate knowledges and skills during such periods. It is so arranged that some students can learn by themselves while the instructor may give individual attention to students practicing on the operating equipment or assist those needing special help.

Although the educational device of the present invention may be more useful for learning some types of subject matter than for others, it lends itself to use of an almost unlimited variety of practice problems regardless of the amount of preliminary study and orientation the student may have had on the problems.

The educational device of the present invention is further adaptable to the student's original degree of knowledge of the problem, and there is provision for changing the amount of guidance given the student as he progresses from no knowledge of the problem to perfect mastery.

Further, the educational device of the present invention may be characterized by two distinct functions. The most important function of the device is that of teaching students educational subject matter through systematic practice with continuous knowledges of the rightness or wrongness of each effort made. It thus applies an important and well-established principle of effective learning, namely, the use of knowledge of results. Setting the device accordingly will cause it to operate appropriately for the student's degree of previous knowledge of the problem to be learned.

The second function of the device is that of testing. Setting the device for this function it eliminates the teaching function thereof and makes it possible to test the student within the same physical context in which he has practiced and learned.

The device of the present invention is further arranged to provide practice under a total of six modes of operation, five practice (learning) modes and one test mode. Each of the practice modes, while providing knowledge of the correctness or incorrectness of each response the student or operator makes, gives varying amounts of assistance to the student, depending upon the student's own speed of learning and previous knowledge of the subject matter. The preferred mode of operation in a given case may be quickly selected on the device, and for each new practice problem, the device is so arranged that response biases due to previous experience with the device in learning other practice problems are ruled out. Furthermore, three of the practice modes of operation are designed especially for classroom training, such as used in military technical schools, and the other two practice modes provide convenient methods for laboratory studies of the learning process. The test mode of operation, usable in both classroom and laboratory, provides for testing students following learning sessions with the device. Also two types of automatic scoring during practice may be provided as described later on.

In general, the invention contemplates the provision of an automatic subject-matter trainer apparatus having an answer panel bearing subject matter in pictorial form arranged in sections, and an electrical system including signal means and switch means for actuating the signal means to indicate a correct or incorrect response of the selection mode, a problem device and stepping switch means for actuating the problem device to successively bring the problem questions in view, scrambler control means for coordinating the signal means with new positions of the subject matter on the answer panel, and mode control means for setting the various modes of operation of the apparatus.

These and other features of the present invention are described in detail below in connection with the accompanying drawings, in which;

Fig. 1 is a view in perspective of a subject-matter trainer embodying the present invention being mounted on a cabinet;

Fig. 2 is an isometric view of the subject-matter trainer clearly showing the top side thereof;

Fig. 3 is a view similar to Fig. 2 but clearly showing the right and rear side elevations of the trainer;

Fig. 4 is a view similar to Fig. 2 but clearly showing the left side elevation of the device;

Fig. 5 is a fragmentary isometric view clearly showing the rear elevation of the device;

Fig. 6 is a diagram of the relay and answer panel circuits of the device; and

Fig. 7 is a diagram of the scrambler and problem wheel control circuits of the device.

Referring now to the drawings, wherein like numerals designate like parts throughout the several views, the embodiment of the trainer device of the present invention illustrated in the drawings comprises a box-like casing 10 formed with a sloping top wall or platform 11 hinged to the upper edge of the rear wall of the casing 10 so that it may be swung open to permit access to the interior of the casing 10 which contains the electrical system of the trainer. The top wall 11 may be held in closed position by a lock 12 provided on the front wall of the casing 10. The casing 10 may be mounted on the upper portion of a cabinet 13 at a convenient height for operation of the trainer by a student or operator from a standing position. The lower portion of the cabinet 13 which is provided with a door 14 may be used for storing a supply of answer card panels 15 or for any other purposes. A cover 16 hinged to the cabinet 13 at the rear upper edge of the cabinet 13 may be held in open position by support members 17 operating in a well-known manner. The cover 16 may be locked in closed position by a lock 18 provided on its front wall as shown in Fig. 1.

The top wall 11 is further formed with a problem window 19 located substantially in the left middle portion of the top wall 11 for the presentation of a series of problem questions. For each problem series, twenty problems, or less than twenty, are printed on a card carried on a problem wheel device 20 mounted for rotation in the casing 10, as shown schematically in Fig. 2, and the problems appear in the window 19 one at a time as the wheel 20 revolves.

The upper surface of the casing top wall 11 is provided with twenty separate sections 21 and is further arranged to removably support the answer card or sheet panel 15, which panel 15 may be held in place as by wing-nuts 22. The panel 15 is provided with twenty subject matter answers in pictorial form for the twenty problem questions on the problem wheel 20. The answer pictures on the panel 15 are arranged in three vertical rows of separate sections 24 corresponding to the casing top wall sections 21, one row having six sections 24 and the other two rows having seven sections 24 each.

At the right of each answer picture section 24 there is an aperture 25 in the panel 15 for clearing the answer button of a switch 26 mounted on the casing top wall 11 in the corresponding section 21 thereon, and which switch 26 is to be pressed whenever that answer has been selected by a student. At the left of each answer picture section 24 there is, likewise, an aperture 27 in the panel 15 for clearing a small green light signal device 28 mounted on the casing top wall 11 in the corresponding section 21 thereon, and which light 28 glows as soon as the corresponding answer switch 26 is pressed, whenever the answer picture chosen by a student is the right answer to the problem question presented in the window 19. In the upper left corner of the top wall surface 11 there is a red light signal device 29 which illuminates to indicate a wrong response whenever a wrong switch 26 is pressed. In the left lower corner of the top wall surface 11 there is located a control switch button 30 operated by a student for activating a stepping switch 31 (Fig. 6) which, when pressed following a right response, causes the problem wheel 20 to rotate so as to present the next question in the problem window 19. A new series of questions and answers may be used by lifting the top wall 11 of the casing 10 and fastening a new problem series card to the problem wheel 20, and by placing a new answer panel 15 on the upper surface of the top wall 11.

A selector switch button 32 on the left side wall 33 of the casing 10 is also employed for activating the green lights 28 for giving directly the correct answer of the problem appearing in the window 19. Also on the casing side wall 33 there is a socket 34 for insertion of a plug 34' of a master control switch button 35 similar to the switch button 30, for activating the stepping switch 31 to activate the problem wheel 20. The switch button 35 is for the experimenter's or instructor's use for a purpose as will be described further below. In addition there are four scrambler control switches 36 on the casing wall 33, the operation of which will be described further below, and a pair of counters 37, 38 for the scoring of the performance during practice trials on the device. Counter 37 may record the total number of answers the student makes, that is, counter 37 tallies one each time an answer switch button 26 is depressed. Counter 38 may record the number of correct responses made. The counter 38 may be reset after each cycle or after a number of cycles. In addition, the experimenter or instructor may have a scoring sheet upon which, for experimental purposes, he records the specific right and wrong responses made.

On the right side wall 39 of the casing 10, there is a power line cord 40 provided with a plug 41 for insertion to a main power socket, and an input power on-off master switch 42. Also, a power on-off indicator light 43 and a main power fuse 44 may be located on the casing wall 39 as shown schematically in Fig. 3.

On the rear side wall 45 of the casing 10, there is a series of mode control switches 46, 47, 48, 49, 50 and 51 for setting any of the six modes of operation of the device. For example, switch 46 is employed for setting the "modified quiz" mode of operation of the device; switch 47 controls the operation of the panel green light signals 28 for indicating the correct answers; switch 48 is a selector switch for giving either the student or the instructor control of the problem wheel 20 activation; switch 49 controls the operation of the wrong answer indicator signal device or red light 29; switch 50 controls the operation of the "quiz-practice" and "quiz" modes of operation; and switch 51 is the buzzer control, if a buzzer as indicated at 23 in Fig. 6, is also employed, for indicating the right or wrong selections according to the position of the switch 51.

As shown schematically in Figs. 2, 6 and 7, the problem wheel device 20 consists of a large masonite wheel, shown in dotted line in Fig. 2, upon which the card with the printed twenty problems is attached in any suitable manner but in some oriented predetermined relation, as previously described above, and which problem wheel 20 is firmly attached to a rotating element 52 of the stepping switch 31 for rotation therewith. The stepping switch 31 further comprises a rigid insulated disc 53 provided with sixty contact points 54 arranged radially in twenty banks of three contacts each numbered 1, 2, 3, etc. as shown schematically in Fig. 7. The rotating element 52 is provided with three separate wiper contacts 55a, 55b, and 55c, which contacts at any one time make electrical continuity with a particular bank of three stationary contacts 54 on the stepping switch disc 53. As the element 52 rotates it may make electrical continuity with each of the twenty banks of the contacts 54 in turn. Rotation of the stepping switch element 52 for moving the wiper contacts 55a, 55b, and 55c, from one bank of contacts 54 to the next is accomplished by a ratchet mechanism indicated generally at 56 in Fig. 6. Voltage applied to the stepping switch 31 energizes a solenoid 57 which produces tension in a spring 58. When the voltage is removed from the solenoid 57, the energy stored in the tension of the spring 58 will cause rotation of the rotating element 52 by the ratchet mechanism 56 to move the wiper contacts 55 to the next bank of contacts 54. This arrangement allows twenty separate problems to be presented at the problem window 19 during a complete revolution of the problem wheel 20 as previously mentioned.

In addition to the six modes of operation of the trainer device mentioned above, there is the "scrambling" operation of the trainer device arranged for overcoming any tendency of the student, over a series of problems, to memorize a fixed series of answer picture positions associated with correct answers. Were the right answers to the twenty successive questions always found in the same position on the panel 15 relative to other answers, it would be possible, eventually for a student to press twenty "right answer" switch buttons 26 in succession without actually knowing the answer to each specific question and thereby defeat the purpose of the trainer. Rearrangement of the operation of the signal light devices 28 and the corresponding control switches 26 is effected by the four scrambler selector switch control knobs 36 shown in Fig. 4.

As shown schematically in Fig. 7, wherein only one scrambler selector switch circuit is shown for purpose of clarity since all four switches 36 are identical, each of the scrambler selector switches 36 being a five-position ten-bank rotary-type may be turned to make circuit contact in any of the five positions of each bank for rearranging operation of five of the correct answer indicating signal devices 28 and the corresponding control switches 26 of the answer panel circuitry as shown in Fig. 6. If all four scrambler switches 36 are therefore turned, all the answers on the panel 15 and the operation of the signal devices 28 by the switches 26 will correspond to the new position of the problems on the rotary problem wheel 20. By operation of the scrambler switches 36, $5^4$ or 625 different arrangements of the answers on the panel 15 may be obtained.

An alternative form of the scrambler selector apparatus may be employed in the trainer device for effectively rearranging operation of the panel signal devices 28 and the corresponding control switches 26 according to various positions of the answers on the panel 15. In this form, each new series of possible answers is mounted on a metal sheet panel (not shown) formed with a combination of notches punched out at the rear or upper edge of the panel. Each answer panel has space for twenty notches along its rear or upper edge. However, only four notches are actually cut, one for each bank of five switches, four banks of five switches being arranged linearly on the casing rear wall 45 adjacent to the rear edge of the panel. Also, inside the casing 10, four automatic switches corresponding to the four banks of switches are employed. With no answer panel 15 being placed thereon, all twenty switches are open. When an answer panel 15 is placed on the casing 10, all switches close except the four switches corresponding to the notches at the edge of the answer panel. The automatic switches then rotate until they reach the open circuit. Connected to each of the four automatic switches is the same circuitry connected to the scrambler selector switches 36, just described above, so that the red and green light signal devices 29 and 28 will function according to the position of the answers on the panel. Thus, whereas the correct answer to the first question on a previous problem may have been found in the lower right-hand corner in the array of answer pictures, the correct answer to the first question in the new problem will be found in another position. It is therefore possible, even for continuous practice on one problem, to change "scrambles" any desired number of times by placing on the casing 10 new answer panels 15 with different notch arrangement thereon.

The operation of the device is as follows: The six modes of operation of the device, mentioned above, consist of the "quiz" mode, the "modified quiz" mode, the "practice" mode, the "single try" mode, the "paced practice" mode, and the "test" mode.

The "quiz" mode of operation is particularly useful for initial learning of an entirely new subject matter; it represents a condition in which the student "quizzes" the machine so as to be shown the right answers. In this mode, the answer to each problem on the problem wheel 20 is given to the student directly by the machine, by first setting the quiz control switch 50, which comprises switches 50a, 50b, and 50c connected together, in proper position wherein switch 50a engages contact 100, switch 50b engages contact 102, and switch 50c breaks engagement with contact 103. To find the correct answer to a problem question present in the problem window 19, the student depresses selector switch 32 and the green light 28 of the correct answer picture glows, thus indicating the correct answer to that problem question. After the student has seen and presumably partly learned the answer, the next problem can be brought up in the problem window 19 by depressing switch button 30 to actuate the device 20. Again depressing selector switch 32 a green light 28 will indicate the proper answer to this new problem, and so on. This process may be continued until all twenty problems and their answers have been identified.

Referring to Figs. 6 and 7 wherein the switches of all the relays are shown in de-energized position, the circuit to the "quiz" mode of operation may be traced as follows. Assume the wiper contacts 55a, 55b and 55c of the rotor 52 of the stepping switch 31 to be positioned so that continuity is made with points 4, 3, and 3a, respectively, of contacts 54 on the stationary stepping switch disc 53. The wall plug 41 of the power cord 40 has been inserted, and the master switch 42 is closed so that light 43 is turned on to indicate that power is applied to the device. The "quiz-practice" switch 50 is in the "quiz" position wherein switch 50a engages contact 100, switch 50b engages contact 102, and switch 50c breaks engagement with contact 103, and the green light signal switch 47 is closed. The selector switch 48 engages contact 108 so that the student stepping switch button 30 is operative. Thus, we see that all points designated by reference letters A, B, and E are now receiving 110 v.-60 cycles; it should be noted that points C and D are not energized since switch 50a is not engaging contact 101. All points designated by reference letter G are connected to the 110 v.-60 cycle return. As shown in Fig. 6, all relays are de-energized with the exception of relay $K_2$, which is energized from A through contacts $a$ and $b$ of relay $K_1$.

If a student presses the selector switch 32, voltage from point B energizes relay $K_6$ causing the relay $K_6$ contacts to engage $b$ to $c$ and $e$ to $f$. Contacts $e$ to $f$ apply holding voltage from A causing relay $K_6$ to remain energized after the student releases the selector switch 32. Voltage from point E through contacts $b$ and $c$ applies 110 v.-60 cycles to transformer $T_2$, which has a secondary output of 6 v.-60 cycles. The 6 v.-60 cycle voltage is applied through the wiper contact 55b of the three-contact rotor 52 to point 3 of the stepping switch disc 53 through a wire 104 to one of the scrambler switches 36 and from the scrambler switch 36 through a wire 105 to one of the green light signals 28 of one of the sections 21. For this specific setting of the scrambler switch 36, the correct answer for the problem, indicated in window 19, is shown on the section 24 that is located second from the bottom in the left row of panel 15. Its corresponding section on the wall 11 of the casing is indicated by 21' and has a signal light 28', which is connected to the wire 105. Thus, application of voltage to the light 28' energizes it to indicate that this section gives the right answer. Since the relay $K_6$ is receiving holding voltage, the green signal light 28' remains lit even after stepping switch 32 is released.

The student may study the correct answer and then depress the switch button 30 to engage contact 106 to energize relay $K_5$ through the closed switch 50b. When energized, the relay $K_5$ again causes a 110 v.-60 cycle voltage to be applied to the solenoid 57 of the stepping switch 31 to produce a tension in the spring 58. Energization of the relay $K_5$ breaks engagement of contact $b$ with contact $a$ to remove the return G from the relay $K_6$ and cause the relay $K_6$ to de-energize whereby voltage is removed from the transformer $T_2$ and the green light 28' is extinguished. The contact $b$ of relay $K_5$ moves into engagement with contact $c$ to produce a circuit from A to G through the counter 38 to advance the counter 38 by one. As soon as the switch button 30 is released, the relay $K_5$ de-energizes whereby the solenoid 57 is de-energized and the energy stored in the tension of the spring 58 advances the rotor 52 of the stepping switch 31 one-twentieth of a revolution. It should be noted that de-energization of the relay $K_5$ returns contact $b$ to engagement with contact $a$ so that relay $K_6$ may be energized when switch 32 is depressed.

In the "modified quiz" mode of operation of the device, a student, having gone through a complete series of problems by using the "quiz" mode described above so that the subject matter is no longer completely unfamiliar to him, attempts to recall the answer to the particular problem presented in the problem window 19 and seeks that answer among the answer pictures on the panel 15. The trainer device is set for this mode of operation by moving the mode control switch 46 into engagement with its contact 107. The student, once decided upon an answer, depresses the control switch 26 of the answer picture he has chosen to move the switch from engagement with its contact $a$ to its contact $b$. If the answer is correct, the green light signal 28' of the section 21' activated by the depressed switch engaging its contact $b$ will glow, and upon depressing switch button 30, a new problem is presented in the problem window. If the chosen answer is not correct, the red signal light 29 will light up for as long as the switch 26 is kept pressed plus about one and one-half seconds to call the student's attention to the fact that the selection was wrong. Simultaneously, however, the device also will automatically light the green signal light 28' of the correct picture, thus indicating to the student the correct answer to the problem. At this stage, however, the stepping switch 31, which actuates the problem wheel 20 to advance the next problem into view in the window 19, is not operative, and the control switch 26 of the answer picture automatically indicated as correct by the device must be pressed for rendering the stepping switch control button 30 operative again. This mode of operation of the trainer device facilitates learning by reinforcing the correct response.

The circuit of the "modified quiz" mode of operation of the device may be traced as follows. Assume the problem wheel 20 and the three-contact rotor 52 are positioned so that electrical continuity is made from the rotor 52 through its contacts 55$a$, 55$b$, and 55$c$ to points 4, 3, and 3$a$, respectively, of the contacts 54 of the stepping switch disc 53. With the four scrambler switches 36 set in the same position, as in the "quiz" operation, as shown in Fig. 7, the section 21' on the casing surface of the top wall 11 again contains the correct answer. The mode selector switch 50 is now in an open position wherein the switch 50$a$ engages contact 101, the switch 50$b$ does not engage its contact 102, and the switch 50$c$ engages contact 103; the switch 51 is moved to "wrong"; the switch 48 is closed to engage its contact 108 so that stepping switch control button 30 is operative; and mode selector switches 47, 49 and 46 are closed. It should be noted that engagement of the switch 50$a$ with the contact 101 and closing of the switch 47 results in all points designated by A, C, D, and E receiving 110 v.-60 cycle voltage while point B is not energized.

Upon examination of the relays (Fig. 6), it is seen that the only relay, which is normally energized, is relay $K_2$ through two paths. One path is through the contacts $a$ and $b$ of relay $K_1$ from A when $K_1$ is de-energized, and the other through the switch 50$c$, wiper contact 55$a$ of rotor 52, point 4 of contact 54 of stepping switch disc 53, a wire 109 to one of the scrambler switches 36, and a wire 110 from the switch 36 to the switch 26 of the section 21' to the source of voltage C. If the student moves the switch 26 of the section 21', which has the correct answer in this case, from its contact $a$ to its contact $b$, it is seen that this disconnects the supply voltage C from relay $K_2$ and applies voltage from C through contact $b$ of switch 26 and wire 111 to relay $K_1$. When $K_1$ energizes, its contact $b$ moves from $a$ to $c$ whereby the voltage from A to the relay $K_2$ is stopped and the relay $K_2$ de-energizes.

It is seen that the only time the relay $K_2$ de-energizes is when the correct answer switch button 26 is depressed since the movement of any of the other switches 26 from its contact $a$ to its contact $b$ will not break the circuit from C to relay $K_2$ through wiper contact 55$a$. However, the depression of any other switch 26 will energize $K_1$ and counter 37 to advance the counter by one. When relay $K_2$ de-energizes, voltage is applied from C through contacts $g$ and $h$ of the relay $K_2$ to energize relay $K_5$. From this point on, the chain of events is identical to those described previously with respect to the "quiz" mode, which resulted in the activation of the green light signal device 28'.

If the student had moved any of the other switches 26 from its contact $a$ to $b$, this would have been an incorrect answer and the relay $K_2$ would not have been de-energized since the energizing path from C to relay $K_2$ through the switch 26 of the section 21' and the wiper contact 55$a$ would not be broken. Thus, the voltage, which energizes the relay $K_1$, also passes through contacts 1 and $k$ of relay $K_2$ to energize the relay $K_3$. The contacts $b$ and $c$ of the relay $K_3$ supply voltage from point D to the red light signal device 29 and, if the mode selector switch 51 is set on "wrong," to the buzzer 23 indicating to the student that the answer he has selected is incorrect. It should be understood that if the switch 51 were set on "correct," the buzzer 23 would be energized whenever the answer is correct. Since a correct answer de-energizes relay $K_2$, voltage from C is applied through contacts $b$ and $a$ of relay $K_2$ and switch 51 to the buzzer 23. However, since the selector switch 46 is closed, voltage from point A through contacts $b$ and $c$ of the energized relay $K_1$ passes to the relay $K_5$ eventually causes the green light of the signal device 28', corresponding to the correct answer, to glow and thereby inform the student of the correct answer even though the wrong switch 26 was depressed.

A unit direction device $CR_1$, a resistor $R_1$, and a condenser $C_1$ are also provided in the circuit of relay $K_3$ to slow down its energizing time. Since it is a property of a relay to de-energize more slowly than it energizes, this would otherwise cause the relay $K_3$ to energize for a very short period of time before the relay $K_2$ could de-energize. For this reason, the red signal light 29 would flash even though the correct answer switch button 26 were moved from its contact $a$ to its contact $b$.

Since the selector switch 50$b$ is open when the switch 50 is in this mode of operation, the stepping switch control button 30 no longer has a direct path to the relay $K_5$ through the switch 50$b$. Examination of the circuit in Fig. 6 shows the continuity between the switch 30 and the relay $K_5$ is now contingent upon the relay $K_4$ being energized. Voltage for energizing the relay $K_4$ comes from C through contacts $d$ and $e$ of the relay $K_2$ when de-energized. Since the relay $K_2$ de-energizes only when the right answer switch button 26 is depressed, the relay $K_4$ can only be energized when the right answer is chosen so that the problem wheel 20 can be rotated only after the student gets the correct answer. Contacts $e$ and $f$ of relay $K_4$ provide holding voltage from A to the relay $K_4$ to maintain the relay $K_4$ energized. The return Z of the relay $K_4$ goes to the inner ring of the stepping switch disc 53 through point 3$a$ (see Fig. 7) and wiper contact 55 of the 3-contact rotor 52 to the 110 v.-60 cycle return G to provide a continuous circuit for the relay $K_4$. Once the switch 30 is depressed causing the problem wheel 20 and the rotor element 52 to step, the rotor 52 passes the open row of contacts of the stepping switch disc 53, and the relay $K_4$ de-energizes preparatory for the next student attempt. This open row of contacts also points up the need for having the relay $K_1$ contacts $a$ to $b$ furnish voltage to the relay $K_2$. Were it not for the relay $K_1$ contribution, the relay $K_2$ would de-energize as the rotor 52 passed the open row of contacts on the stepping switch disc 53.

After a problem series has been partially learned through use of the two modes of operations of the device as described above, a student may still undergo the process of learning a subject matter to perfection by giving the student less aid and requiring him to recall the material learned and then checking the correctness or incorrectness of his recall. This is accomplished by the "practice mode" of operation of the trainer device in which mode a problem is presented in the problem window 19 and the student again selects what he considers the correct answer on the answer panel 15 and indicates his selection by depressing the corresponding switch button 26. If the answer selected is the correct one, again the green light of the corresponding signal 28 glows, and a new problem may be presented by depressing the stepping switch button 30. If the answer is not the correct one, the red light of the signal 29 is turned on and/or the buzzer 23 sounds, thus calling the attention of the student to the incorrectness of his answer. Unlike the "modified quiz" mode of operation, however, the device does not indicate the correct answer, but the student is required to make successive choices until he finds the correct answer. As soon as the correct answer is found, the switch 30 becomes operational and a new problem can be presented in the problem window 19. To accomplish this mode, all of the switches and relays are in the same position as the "modified quiz" mode except the mode selector switch 46, which is in the open position so that the only time that the relay $K_6$ can energize is when the relay $K_2$ de-energizes when the switch 26 of section 21', which contains the right answer, is depressed. The de-energizing of the relay $K_2$ allows its contacts $g$ and $h$ to engage to supply voltage from C to relay $K_6$.

The "paced practice" mode of the operation of the trainer device duplicates the "practice" mode of operation, just described above, with the only difference being that the time a student is allowed to ponder the answer to a question is limited. In this mode of operation, the mode selector switch 48 is placed in engagement with its contact 112 rather than its contact 108 to give the instructor control of the problem wheel 20 for presentation of each successive problem in the window 19 through the switch 35. Since the stepping control switch 30 is never operational until the correct answer control switch 26 has been pressed for the previous answer, the experimenter or instructor, in this mode of operation, has the use of the stepping control switch 35, which has the same function as the control switch 30, but the switch 35 is operational at all times. The switch 35 is plugged into the socket 34, and by this switch 35, the instructor or experimenter can operate the problem wheel 20 through energizing the relay $K_5$ whereby voltage is applied to the solenoid 57 from A through contacts $e$ and $f$ of relay $K_5$ to bring a new problem in the window 19 at any time whether or not the correct answer has been found, and, whether a switch 26 has been pressed by the student.

During the "paced practice" mode of operation, the mode selector switch 48 engages its contact 112 so that the instructor's stepping switch control button 35 is operative and does not engage its contact 108 so that the student's stepping switch control button 30 is inoperative. Since the switch button 35 bypasses the relay $K_4$ circuitry, the examiner does not have to wait for a right answer switch button 26 to be depressed before moving the problem wheel 20. The switch button 35 is detachable by means of the plug 34' and the socket 34.

In the "single try" mode of operation which is similar to the "paced practice," just described above, in which it is not necessary that a correct answer switch 26 be activated in order to allow the operation of the problem wheen 20 for the presentation of the next problem, a student may be allowed only one answer for each problem. The device will indicate the correctness or incorrectness of his answer, but in either case the student is required to go on immediately to the next problem since the instructor presses the stepping control switch 35 after each answer the student makes.

In the "test" mode of operation of the device, the answer indicating signal devices 28 and 29 are rendered inoperative. This is accomplished by the mode selector switches 47 and 49 being in the turned-off or open position. In this mode, the student is allowed one answer. The correctness or incorrectness of his selection may be recorded by the instructor but is not indicated to the student.

In an alternative form of mode of operation selection apparatus, the circuitry of the mode selector switches 46 to 51 may be changed to individual wafers of a gauged rotary switch, not shown. Consequently, the operator needs only to turn the rotary switch to the desired mode for all circuits to be arranged for operation in the chosen mode.

The present invention has been described in detail above for purposes of illustration only and is not intended to be limited by this description or otherwise except as defined in the appended claims.

We claim:

1. A subject-matter trainer device comprising means for removably supporting an answer panel, said answer panel having a plurality of preselected answers arranged in sections thereon in pictorial form, a first series of visual signal means positioned on said panel adjacent said panel sections for indicating a correct answer selection thereof, signal means positioned on said panel adjacent said panel sections remote from said first series of signal means for indicating an incorrect answer, signal control switch means for actuating a predetermined series of either of said signal means, signal selector switch means for automatically actuating said first mentioned signal means for always indicating a correct answer, rotatably mounted problem bearing wheel means for successively presenting a series of problem questions corresponding in a predetermined manner to said plurality of preselected answers, window panel means disposed in said trainer device adjacent said answer panel in visual alignment with said problem bearing wheel means, first stepping control switch means for actuating said problem bearing wheel means to present a new problem to be solved in view of said window panel means, second stepping control switch means for actuating said problem bearing wheel means independently of said first stepping control switch means, and mode control switch means for setting all of said means for various modes of operation suitable for various types of instruction.

2. A subject-matter trainer device comprising a casing having an inclined surface removably supporting an answer panel thereon, said answer panel having subject matter in pictorial form arranged in separate sections, visual means for indicating a correct answer selection from said answer panel corresponding to a problem presented in a window on said casing surface and visual means for indicating an incorrect answer, control means for actuating either of said visual means and selector means for automatically actuating any of said visual means corresponding to correct answer of problems presented in said window, rotatably mounted means bearing a series of problem questions corresponding to each of said answer panel sections and stepping control means for actuating said problem bearing means for successively presenting a problem question in said window, master stepping control means for actuating said problem bearing means independently of said stepping control means, and mode selector means for setting a plurality of modes of operation of said device comprising a rigid insulated disk having a plurality of stationary contact points arranged radially thereon, a rotatably mounted element affixed to said rotatably mounted wheel means for rotation therewith and having a plurality of separate wiper contacts in electrical contact with a predetermined number of said stationary contact points, and a means for rotating said rotatably mounted element for moving said wiper contacts from one to another series of said stationary contact points, said means comprising a ratchet mechanism in operative engagement with said rotatably mounted element and a pawl for step-by-step rotation of said ratchet mechanism including an electrically urged spring means attached to said pawl for operation thereof to rotate said ratchet mechanism and said rotatably mounted element to move said wiper contacts to electrical interconnection with another preselected series of said stationary contact points.

3. A subject-matter trainer device comprising means for removably supporting an answer panel thereon, said panel having a plurality of answers arranged in separate sections thereon, said means being provided with a window for visually presenting a successive series of problem questions corresponding to the answers on said panel, a panel control circuit including a signal device for indicating the correct answer and a control switch for activating said signal device for each of said panel sections, a wrong response signal device for activation by any of said control switches, a problem control circuit including a rotary device having a series of problem questions thereon for successive viewing through said window, a stepping control switch for actuating said rotary problem device, and a plurality of scrambler control circuits including control switches for rearranging operation of said panel signal devices and the control switches corresponding thereto so as to correspond to the particular positions of the answers in said panel sections each of said scrambler control circuits comprising a five position, ten-bank rotary type scrambler selector switch in circuit with and controlling said signal devices for rearranging operation of a predetermined number of signal devices and the control switches corresponding thereto.

4. A subject-matter trainer device comprising a main casing having a platform for removably supporting a panel having subject matter in the form of answers arranged in separate sections thereon, said platform having a window for visually presenting a successive series of problem questions, and an electrical circuit system positioned within said casing including a separate signal device for each of said panel sections for indicating a right selection, a separate control switch for each of said signal devices for activation thereof corresponding to a predetermined answer on each of said panel sections, a signal device for indicating a wrong selection actuated by any of said control switches, a selector switch for actuating any of said sections for indicating a right selection, a problem rotary device bearing a predetermined series of problem questions corresponding to the predetermined answers on said separate panel sections, control means for actuating said problem device to successively bring the problem questions in visual alignment with said window comprising a rotatably mounted stepping switch including a first disk fixed thereto having a set of separate wiper contacts mounted thereon, a second rigid insulated disk positioned adjacent to said first disk and having a plurality of stationary contacts disposed in separate banks thereon in successive engagement with said wiper contacts, and means for moving said first disk and the wiper contacts mounted thereon from electrical contact with one of said separate banks to another to move said problem rotary device successively from one problem display position to another, a second stepping control switch for actuating said problem device independently of said first-mentioned stepping control switch, and a plurality of scrambler control switch means in circuit with and for rearranging operation of a predetermined series of said panel signal devices and said control switches so as to correspond to any arrangement of the position of the answers in said panel section.

5. A subject-matter trainer device arranged for operation under various modes, comprising means for removably supporting a panel having subject matter in the form of answers arranged in separate sections thereon, said means having a window for presenting a series of problem questions corresponding to the answers on said panel, a panel control circuit including a signal device for each of said panel sections for indicating a correct response, an incorrect response signal device, a control switch for each of said correct response signal devices, said control switches arranged for actuating said incorrect response signal device, a selector switch for said correct response signal devices for automatically actuating the signal devices corresponding to correct responses, a problem control circuit including a rotating device bearing problem questions thereon, a stepping control switch under control of a student for actuating said problem rotating device to successively present problem questions in said window, a master stepping control switch under control of an instructor for actuating said problem rotating device, a scrambler control circuit including switch means for rearranging operation of said panel signal devices so as to correspond to the proper answers arranged in various locations on said panel, and mode selector switch means for setting said circuits for various modes of operation suitable for various types of instruction comprising a first mode control switch in circuit with said first-named stepping control switch to selectively energize said stepping control switch, a second mode control switch in circuit with and selectively energizing a predetermined panel control switch, and a third mode control switch in circuit with said master stepping control switch to energize said master stepping control switch.

6. A subject-matter trainer device comprising a member for removably supporting a sheet panel, said panel having educational matter in answer form arranged in separate sections, a plurality of electrically controlled signal devices, a manually operable switch for each of said signal devices, electrical connections controlled by each of said switches for normally operating the corresponding one of said signal devices, an additional signal device electrically connected to said switches for operation thereof by any of said switches, a manually operable selector switch electrically connected to said signal devices for selectively operating said signal devices, an electrically controlled problem device comprising a rotatably mounted problem wheel having a plurality of separate problems disposed on one side thereof in pictorial form and visible to the operator of the subject matter trainer device, manually operable stepping switches and electrical connections controlled by said stepping switches for actuating said problem device comprising a nonrotatable disk positioned adjacent said problem wheel on the side thereof remote from said problems and having a plurality of sets of immovable electrical contacts and a rotatably mounted disk affixed to said problem wheel adjacent said nonrotatable disk and having a predetermined number of electrical wiper contacts in successive electrical contacting engagement with one or the other of said sets of immovable electrical contacts for actuating said problem wheel to a preselected position to visibly expose to view a selected one of said plurality of problems, manually operable scrambler switches electrically connected to said signal devices and said problem device for coordinating said signal devices and said problem devices, and a mode selector electrically connected to said electrical connections of said signal devices and said problem device for setting various modes of operation thereof suitable for different types of instruction.

References Cited in the file of this patent

UNITED STATES PATENTS

| | | |
|---|---|---|
| 1,749,226 | Pressey | Mar. 4, 1930 |
| 1,929,872 | Lavery et al. | Oct. 10, 1933 |
| 2,104,718 | Dougherty | Jan. 4, 1938 |
| 2,157,058 | Ray | May 2, 1939 |
| 2,213,974 | Baker | Sept. 10, 1940 |
| 2,311,055 | Kopas | Feb. 16, 1943 |
| 2,317,107 | Oesch | Apr. 20, 1943 |
| 2,349,066 | Witter | May 16, 1944 |
| 2,401,434 | Mills | June 4, 1946 |
| 2,564,089 | Williams et al. | Aug. 14, 1951 |